(No Model.)
F. P. STANLEY.
CLOTHES LINE.
No. 400,503. Patented Apr. 2, 1889.
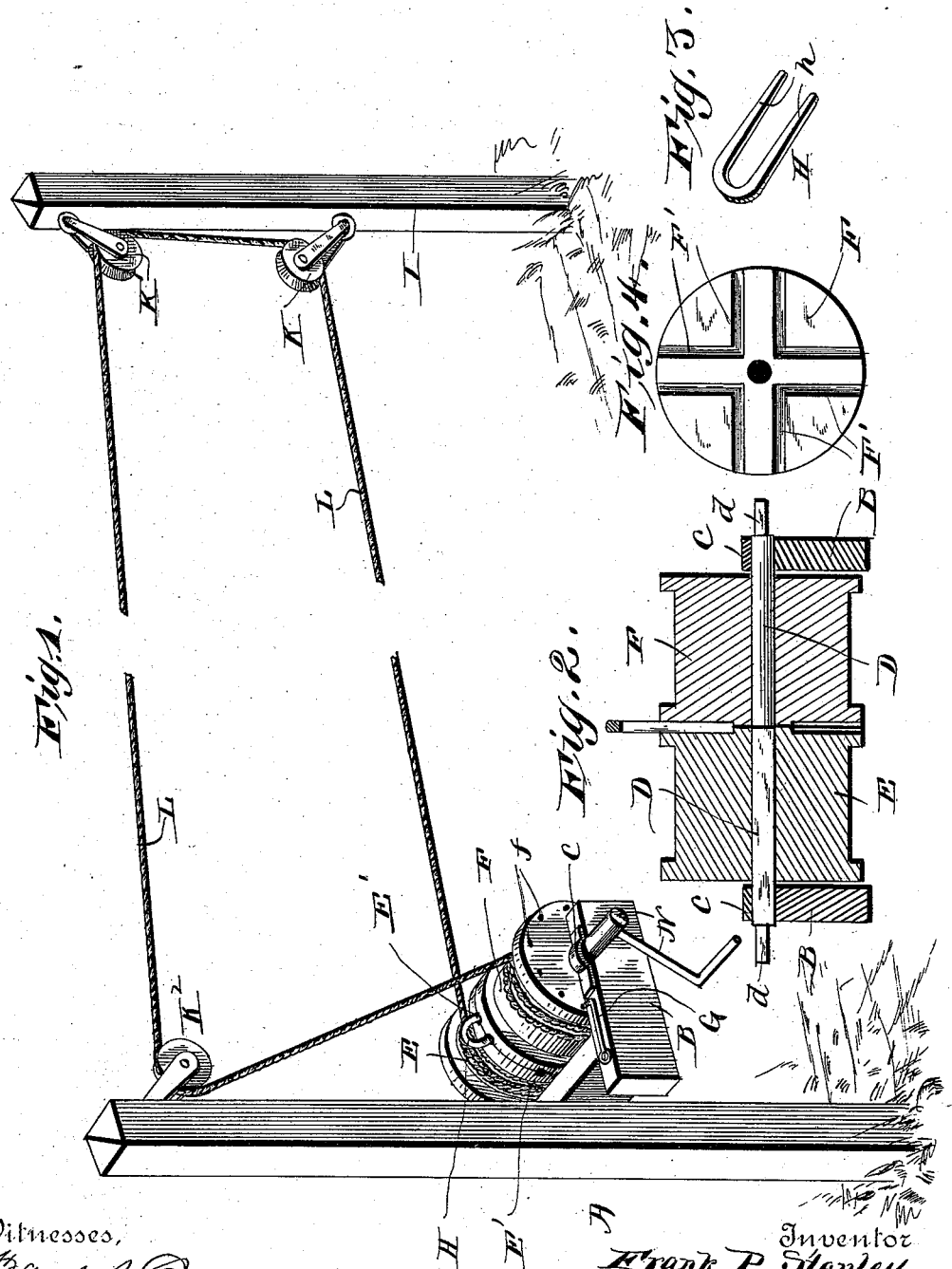
Witnesses,
Frank S. Eber
R. J. Marshall
Inventor
Frank P. Stanley,
By his Attorneys,
C. A. Snow & Co.

UNITED STATES PATENT OFFICE.

FRANK PIERCE STANLEY, OF SPENCER, IOWA.

CLOTHES-LINE.

SPECIFICATION forming part of Letters Patent No. 400,503, dated April 2, 1889.

Application filed August 21, 1888. Serial No. 283,327. (No model.)

*To all whom it may concern:*

Be it known that I, FRANK PIERCE STANLEY, a citizen of the United States, residing at Spencer, in the county of Clay and State of Iowa, have invented a new and useful Improvement in Clothes-Lines, of which the following is a specification.

The object of this invention is to provide a simple, cheap, and effective device for operating clothes-lines, whereby the operator may fill the line from one point, this arrangement being of special advantage when snow is on the ground or it is for any other reason inconvenient to pass from one point of the line to the other.

The invention consists in a certain novel construction and combination of devices, fully set forth hereinafter in connection with the accompanying drawings, and specifically pointed out in the appended claims.

In the drawings, Figure 1 is a perspective view of my improved clothes-line hanger. Fig. 2 is a transverse sectional view through the reels or spools. Fig. 3 is a detail view of the key which locks the reels together. Fig. 4 is an end view of one of the reels.

Referring to the drawings by letter, A designates a suitable standard, to which is attached the frame B, having the bearings C C in its opposite sides, and D designates a shaft which is mounted in the said bearings, and is provided at its ends with the squared extension $d\ d$. One half of the portion of the shaft which is located between the bearing is squared, on which is mounted the rigid reel E, and the other half of the said portion of the shaft is round, on which is mounted the movable reel F, which is adapted to turn independent of the shaft. The movable reel is provided at its outer end with the series of sockets $f$, in one of which is adapted to be engaged the latch or lock G, to lock the reel in any desired position. The contiguous ends of the reels E F are provided, respectively, with radial grooves E' F', which are adapted to be registered in pairs to form sockets to receive the arms $h\ h$ of a key, H, the said key being formed in the shape of a loop with separated arms to enter the said sockets. A standard, I, similar to the standard A, is adapted to be arranged at a suitable distance therefrom, to which are attached the loose pulleys K K', and a similar pulley, $K^2$, is mounted on the standard A above the reels. One end of the cord or wire L is attached to the rigid reel E, is carried from thence to the standard I and around the pulleys K K', is thence carried back to the standard A and around the pulley $K^2$, and is then attached to the reel F.

The operation of the device is as follows: Having engaged the key in registering grooves in the contiguous ends of the rolls to lock them together, and wound all the surplus cord or wire on the reel E, the articles are attached consecutively to the line adjacent to the said reel, and the said reel is rotated at intervals by means of a crank or key, N, arranged on the squared end of the shaft, thus carrying the said articles away from the operator until the portion of the cord or wire between the reel E and the lower pulley, K, on the post I is filled. To remove the articles, it is simply necessary to reverse the operation. When the cord or wire is not in use, it is wound on the reel E, and therefore kept clean and in condition for use. If the cord or wire becomes loose, engage the latch or hook with the movable reel, remove the key from engagement with the adjacent ends of the reels, turn the shaft (and consequently the rigid reel attached thereto) until the desired tension is obtained, and then replace the key.

Having thus described the invention, I claim—

1. The combination, with the cord or wire, of a transverse shaft carrying a rigid reel to which is attached one end of the cord or wire, the loose reel mounted on the said shaft and having the other end of the cord or wire attached thereto, and the key engaging registering grooves in the contiguous ends of the said reels, substantially as specified.

2. The combination, with the cord or wire, of the transverse shaft D, provided with a squared portion and a round portion, the reel E, mounted on the squared portion of the shaft and adapted to turn with the same, the reel F, mounted on the round portion of the shaft, the contiguous ends of the reels being provided with radial grooves E' F', which are adapted to register, and the loop-shaped key H, having its arms $h\ h$ inserted in the said registering grooves, substantially as specified.

3. The combination, with a cord or wire, of the shaft having the rigid reel E and the movable reel F mounted thereon, and having the ends of the cord or wire attached respectively thereto, the key adapted to engage registering grooves in the contiguous ends of the reels, and the hook or latch adapted to engage a socket in the free end of the reel F, substantially as specified.

In testimony that I claim the foregoing as my own I have hereto affixed my signature in presence of two witnesses.

FRANK PIERCE STANLEY.

Witnesses:
ELLIS Z. SMOCK,
EDWIN D. TAYLOR.